United States Patent
Ramsthaler

(10) Patent No.: US 6,820,342 B2
(45) Date of Patent: Nov. 23, 2004

(54) ADJUSTABLE MEASURING AND MARKING DEVICE

(75) Inventor: John Ramsthaler, Nutley, NJ (US)

(73) Assignee: Feddynagh, Inc., Clifton, NJ (US)

( * ) Notice: Subject to any disclaimer, the term of this patent is extended or adjusted under 35 U.S.C. 154(b) by 0 days.

(21) Appl. No.: 10/197,310

(22) Filed: Jul. 16, 2002

(65) Prior Publication Data

US 2002/0174551 A1 Nov. 28, 2002

Related U.S. Application Data

(63) Continuation of application No. 09/602,958, filed on Jun. 23, 2000, now Pat. No. 6,418,631.

(51) Int. Cl.$^7$ .............................. G01B 3/08; B43L 13/00
(52) U.S. Cl. .......................................... 33/41.4; 33/809
(58) Field of Search ................................ 33/41.4, 41.1, 33/41.6, 42, 44, 29 L, 806, 810, 811, 812, 374, 666, 669

(56) References Cited

U.S. PATENT DOCUMENTS

| | | | | |
|---|---|---|---|---|
| 564,342 A | * | 7/1896 | Sherman | 33/666 |
| 648,576 A | * | 5/1900 | Taylor | 33/809 |
| 695,661 A | * | 3/1902 | Theibault | 33/810 |
| 952,275 A | * | 3/1910 | De La Pena | 33/296 |
| 1,003,626 A | * | 9/1911 | Malcolm | 33/760 |
| 2,356,544 A | * | 8/1944 | Swanson | 33/809 |
| 2,518,128 A | * | 8/1950 | Dufilho | 33/809 |
| 2,551,747 A | * | 5/1951 | Ille | 33/41.4 |
| 3,492,737 A | * | 2/1970 | Swanson | 33/666 |
| 4,318,228 A | * | 3/1982 | Kimura | 33/809 |
| 4,566,200 A | * | 1/1986 | Brady et al. | 33/809 |
| 4,733,475 A | * | 3/1988 | Youmans | 33/194 |
| 4,903,409 A | * | 2/1990 | Kaplan et al. | 30/293 |
| 5,070,620 A | * | 12/1991 | Crain et al. | 33/296 |
| 5,343,628 A | * | 9/1994 | Ham | 33/809 |
| 5,414,942 A | * | 5/1995 | Moore et al. | 33/666 |
| 5,873,175 A | * | 2/1999 | Johnston | 33/809 |
| 5,915,810 A | * | 6/1999 | Cameron | 33/809 |
| 6,085,434 A | * | 7/2000 | Mitchell | 33/295 |
| 6,418,631 B1 | * | 7/2002 | Ramsthaler | 33/41.4 |

\* cited by examiner

*Primary Examiner*—Christopher W. Fulton
(74) *Attorney, Agent, or Firm*—Wolff & Samson PC

(57) ABSTRACT

An adjustable measuring and marking device is provided. The device has a lower portion with a bottom end and an upper end and an upper portion with a bottom end and an upper end. The upper portion telescopically interconnects with the lower portion. Measurement intervals, such as inches, are marked along the upper and lower sections so that one can use the device as a measuring apparatus. Measurements can be read at the upper end of the bottom portion, off the top portion, in inches, as well as in feet and inches. A friction fit exists between the upper and lower sections so that a measurement obtained by extending the upper section from the lower section so that the entire device is positioned between two points, can easily be transferred to another location, as the relative position of the upper and lower sections are maintained by the friction fit. Overextending the upper portion out of the lower portion is prevented by a locking pin device. A plurality of markers can be attached to the device, at desired locations therealong, for marking desired locations on a surface. Such markings are accomplished by placing the device at a desired location, and twisting one's wrist to move the plurality of marking devices against a surface to place marks thereon.

18 Claims, 3 Drawing Sheets

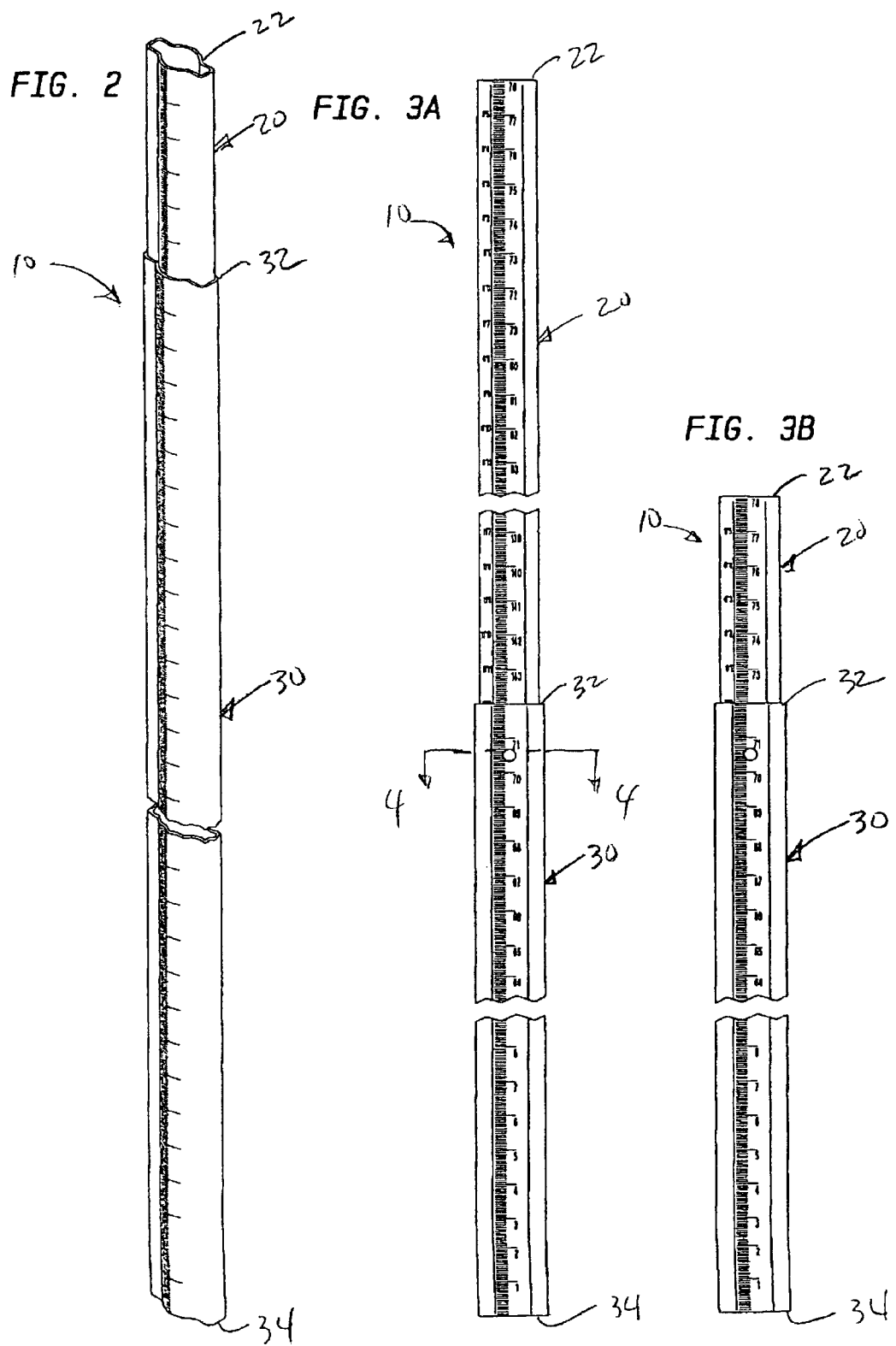

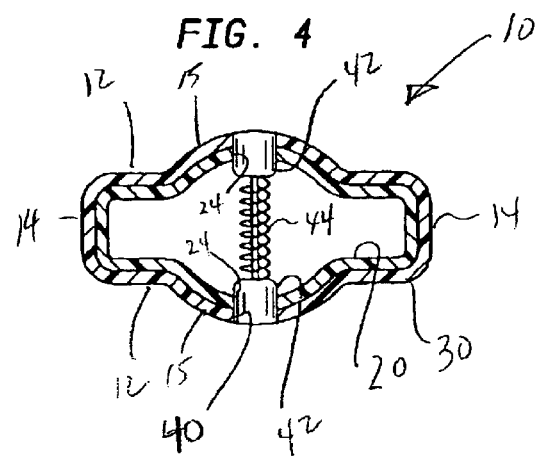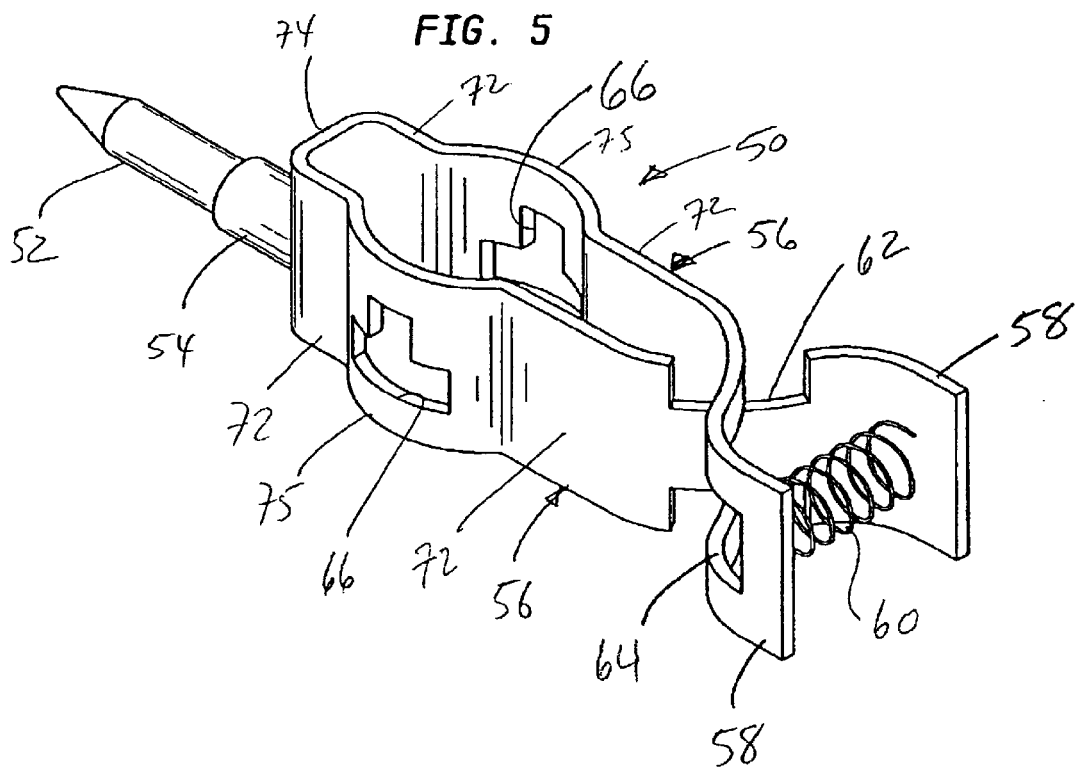

ADJUSTABLE MEASURING AND MARKING DEVICE

RELATED APPLICATIONS

This is a continuation application of U.S. patent application Ser. No. 09/602,958 filed Jun. 23, 2000, now U.S. Pat. No. 6,418,631 issued Jul. 16, 2002, the entire disclosure of which is expressly incorporated herein by reference.

BACKGROUND OF THE INVENTION

1. Field of the Invention

The present invention generally relates to an adjustable device for measuring distances and for placing marks at measured distances, and more specifically to a device for simultaneously placing marks at a plurality of measured distances.

2. Related Art

For those in the construction field, e.g. carpenters, electrical contractors and other craftsmen, it is often desirable to measure a distance between points. It is also often desirable to transfer that measured distance to another location, and to mark the distance at the other location. This is typically done with a tape measure, but tape measures are cumbersome in that two hands are required to operate them, and the tape can retract during the transfer process and/or measurements can be forgotten. Further, it can become difficult to hold the tape measure and simultaneously place a mark at a location.

Another area of concern to the craftsman is the marking of a plurality of locations on a wall, for example, the location of light switches or outlets on a wall, and/or measuring a plurality of locations along a beam for purposes of placement of studs at specific, repeating intervals. For example, studs may be placed along a beam at spaces of sixteen inches to form a wall. Again, the normal procedure involves utilizing a tape measure and marking the distance at each location. Again, this is a cumbersome and inaccurate solution. Additionally, multiple locations are difficult if not impossible to simultaneously mark by this method.

Previous efforts developed in the past to assist with these problems include the following:

U.S. Pat. No. 5,873,175 to Johnston, discloses a telescoping measurement transfer device for taking measurements comprising a plurality of telescopic portions with marked intervals. The device can be used as a straightforward measuring apparatus, or as a measurement transfer apparatus wherein the end stops can be positioned in a proper location and then placed against a work piece and the stop ends can be used as guides for a marking pencil.

U.S. Pat. No. 3,492,737 to Swanson, discloses a telescoping ruler. The device includes a pencil carrier at one end.

U.S. Pat. No. 5,414,942 to Moore, et al., discloses a device for measuring baluster lengths having a telescoping shaft with a measuring scale and a cockable/releasable pointed tip at the edge for making indentation markings on the surface.

U.S. Pat. No. 5,343,628 to Ham, discloses a vehicle repair measuring device for comparing distances between one or more reference points on a vehicle body and pairs of vehicle body components that are spaced therefrom.

U.S. Pat. No. 4,318,228 to Kimura, discloses leveling pole having telescoping components with elliptical cross sections having graduations marked along the length of the sections. The sections are locked into an open position by a locking button. The device can be used for determining a distance for measuring the height of trees.

U.S. Pat. No. 2,356,544 to Swanson, discloses a measuring device comprising telescoping sections wherein the sections are automatically locked in an extended position and automatically released as successive sections are telescoping to one another.

U.S. Pat. No. 1,003,626 to Malcolm, discloses a measuring pole having telescoping sections that can be linked together in an extended position. A measuring tape can be interconnected with the pole.

None of these previous efforts, however, address all of the areas of concern of the present invention. Accordingly, what is needed, and has not heretofore been provided, is a simple and effective system for measuring, transferring a measurement, and marking one or more locations at specified intervals.

OBJECTS AND SUMMARY OF THE INVENTION

It is an object of the present invention to provide a measuring stick to quickly and easily measure distances.

It is an additional object of the present invention to provide a measuring stick with a first portion and a second portion which telescopes from the first portion.

It is a further object of the present invention to provide a measuring stick that provides measurements simultaneously in inches alone, as well as in feet and inches.

It is even a further object of the present invention to provide an adjustable measuring stick wherein measurements can be conveniently read at an upper end of a lower portion of the stick.

It is another object of the present invention to provide an adjustable measuring stick that allows for marking desired locations.

It even another object of the present invention to provide a measuring stick having a plurality of marking devices positionable at desired intervals therealong for simultaneously marking a plurality of desired locations.

It yet another object of the present invention to provide a method for simultaneously marking a plurality of locations at specific intervals.

It is even an additional object of the present invention to provide a device for marking locations which is operated by grasping the device with one's hand and twisting one's wrist to mark multiple locations.

The present invention relates to an adjustable measuring and marking device having a lower portion with a bottom end and an upper end, and an upper portion with a bottom end and an upper end, wherein the upper portion telescopically interconnects with the lower portion. Measurement intervals, such as inches, are marked along the upper and lower sections so that one can use the device as a measuring apparatus. Measurements can be read off the top portion, at the upper end of the bottom portion, in inches, as well as in feet and inches. A friction fit exists between the upper and lower sections so that a measurement obtained by extending the upper section from the lower section can easily be transferred to another location, as the relative position of the upper and lower sections are maintained by the friction fit. Overextending the upper portion out of the lower portion is prevented by a locking pin. A plurality of markers can be attached to the device, at desired locations therealong, for marking desired locations on a surface. Such markings are accomplished by grasping the device, placing the device at a desired location, and twisting one's wrist to move the plurality of marking devices against a surface to place marks thereon.

BRIEF DESCRIPTION OF THE DRAWINGS

Other important objects and features of the invention will be apparent from the following Detailed Description of the Invention taken in connection with the accompanying drawings in which:

FIG. 2 is a perspective view of the device shown in FIG. 1 with the upper portion retracted into the lower portion and with the intervals shown marked thereon.

FIG. 3A is a side plan view of the device shown in FIG. 1 in an extended position with the intervals marked hand labeled in inches, as well as in feet and inches.

FIG. 3B is a side plan view of the device shown in FIG. 3A in a fully retracted position.

FIG. 4 is a cross-sectional view of the device shown in FIG. 1 along the line 4—4.

FIG. 5 is a perspective view of the marker attachment mechanism for interconnecting with the device as shown in FIG. 1.

DETAILED DESCRIPTION OF THE INVENTION

Figure 1:
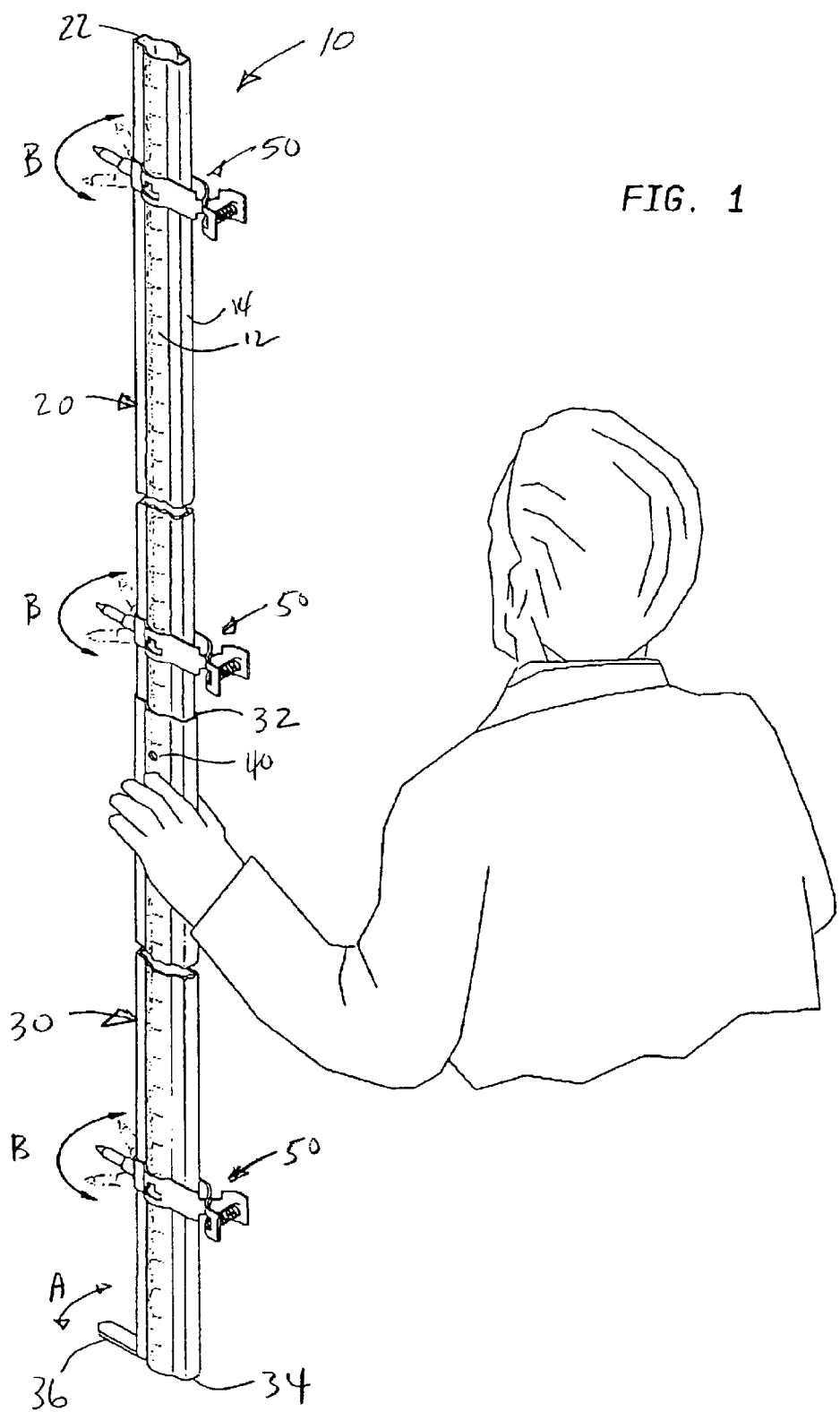
FIG. 1 is a perspective view of the adjustable measuring and marking stick of the present invention.

The present invention relates to an adjustable measuring and marking device for use by craftsmen to measure distances between points, transfer the measurements to other locations, and for marking one or more desired locations along a surface.

As shown in FIG. 1, the present invention comprises an adjustable measuring stick, generally indicated at 10 including an upper portion 20 and a lower portion 30. The upper portion 20 telescopically interconnects with the lower portion 30 and can be moved in and out of lower portion 30 to adjust the overall length of the stick 10. Importantly, the fit between the upper portion 20 and the lower portion 30 includes sufficient friction to retain the relative position of the upper portion 20 with respect to the lower portion 30 when the portions are positioned with respect to one another, but is not too strong to prevent the easy adjustment of the relative position of the upper portion 20 with respect to the lower portion 30.

As can be seen in FIGS. 1 and 2, and also in FIG. 4, the upper and lower portions 20 and 30 respectively, have a similar shape. Generally, the device 10 has longer side walls 12 with shorter end walls 14. The side walls 12 include semi-circular bulges 15 so that the overall shape of the device is rectangular with a central bulge 15. Other shapes are considered within the scope of the present invention. However, as will hereinafter be described, it is desirable that the cross section of the device is non-circular so that same can be easily grasped and pivoted about a central axis to effect the marking of desired locations.

The upper portion 20 includes a top end 22, and a lower end, not shown. The lower portion 30 includes a top end 32 and a bottom end 34. A pivoting heal 36 may be interconnected with the bottom end 34 for purposes hereinafter described.

In order to prevent over extension of the upper portion 20 from the lower portion 30, a lock pin assembly is provided. This assembly is shown in detail in FIG. 4. The lower portion 30 includes opposing lock pin apertures 40 in the bulged area 15 for accepting lock pins 42. The lock pins 42 are positioned within opposing lock pin apertures 24 within the upper portion 20 and are retained therein. The lock pins 42 are biased away from each other by lock pin spring 44. Any other biasing means known in the art to urge the lock pins 42 in opposite directions are considered to be within the scope of this invention. When the upper portion 20 is withdrawn from the lower portion 30 sufficiently that the lock pin apertures 24 align with the lock pin apertures 40, the lock pin spring 44 forces the lock pins 42 beyond the lock pin apertures 24 and into lock pin apertures 40. This effectively locks the upper portion 20 with respect to the lower portion 30 and prevents further relative movement in either direction. This prevents the inadvertent overextending of the upper portion 20 from the lower portion 30. The locking mechanism can be overcome by pressing the lock pins 42 together, or towards each other, to overcome the bias of the lock pin spring 44 to move the lock pins 42 out of the lock pin apertures 40, but still within the lock pin apertures 24, to allow the upper portion 20 to move with respect to lower portion 30. Importantly, any other mechanism for preventing overextending of the upper portion 20 from the lower portion 30 is considered within the scope of the present invention.

Referring back to FIG. 1, a plurality of marking devices 50 are shown positioned along the length of the measuring stick 10. The marking devices 50 are shown with more detail in FIG. 5. Essentially, the marking device 50 comprises a marker 52 which is positioned in a marking holder 54. The marking holder 54 is positioned on a mechanism for attachment to the measuring stick. Essentially, the attachment mechanism comprises two opposing faces 56 shaped in accordance with the configuration of the measuring stick 10, i.e. the opposing faces include a forward wall 74 which supports the marker holder 54 and which is shaped in accordance with end wall 14 of the measuring stick 10. The faces 56 further include bulges 75 which correspond to bulges 15 on the measuring stick 10. The bulges 75 extend from side walls 72. The side walls 72 also include windows 66 for taking measurement readings, as will be hereinafter described. At the end of the face 56 away from the end wall 74, the faces 56 terminate with opposing release tabs 58 which are interconnected with the faces 56, one by a finger 62 which extends through a slot 64 in the other. The tabs 58 are spaced apart and maintained in a spaced apart relationship by a biasing means such as spring 60.

In operation, the marking device 50 is interconnected with the stick by pressing the tabs 58 to overcome the spring bias 60 to move the opposing engagement faces 56 apart from each other to generally open the marking device 50 and allow the marking device 50 to be positioned on and moved along the measuring stick 10. When located in a desired position, which can be identified by taking a reading of the measurement location from the measuring stick 10 through window 66, the tabs 58 are released and the bias spring 60 forces them apart to force opposing engagement faces 56 together to surround and engage the measuring stick 10 to retain the marker 50 at a specific desired location along the measuring stick 10. Any number of marking devices 50 can be interconnected with the measuring stick 10, at desired locations therealong, to allow for a plurality of locations to be marked in a single operation, as will hereinafter be described.

Referring to FIG. 2, the measuring stick device 10 is shown in a retracted position. Again, the lower portion 30, with a bottom end 34 and upper end 32 is shown. Upper portion 20 with upper end 22 is shown inserted into lower portion 30. At full insertion, six inches of the upper portion 20 extend beyond the upper end 32 of lower portion 30.

Referring to FIG. 3A, the lower portion 30 and upper portion 20 are again shown, but in an extended position.

Additionally, the marked intervals along the measuring stick 10 are shown. As such, it can be seen that the lower portion 30 is a total of seventy-two inches (six feet). Intervals are marked, on an inch basis, from one to seventy-one, with seventy-two being located at the upper edge 32 of the lower portion 30. FIG. 3B shows the same view as FIG. 3A except the device 10 is shown in a retracted position. Again, the lower portion 30 is marked from one to seventy-one, with seventy-two inches or six feet being at the top end 32. The upper portion 20 is marked at an upper end 22 with seventy-eight inches, which indicates that six inches of the upper portion 20 extend out of the lower portion 30 when in the fully retracted position. When retracted, the measurement marks are continuous along the length of the lower portion 30 from one to seventy-two, and thereafter followed by marks on the upper portion 20 from seventy-three to seventy-eight inches (six and one half feet).

Importantly, measurements beyond six feet, six inches are read at the six foot line, i.e. at top edge 32 of lower portion 30, any time the device is extended beyond six feet, six inches. Accordingly, referring back to FIG. 3A, the measurement mark below seventy-two inches is seventy-nine inches. This measurement is arrived at as follows: when in the fully retracted position, measurement is taken at the top end 22 of the upper portion 20 and the measurement of the fully retracted device is seventy-eight inches. Once the upper portion 20 is extended beyond its fully retracted position, measurements are read at the top end 32 of lower portion 30. Accordingly, when the upper portion 20 is moved one inch beyond the lower portion 30, the device will be seventy-nine inches long, and this is reflected in the number seventy-nine marked on the upper portion 20 below seventy-two, which appears at the upper edge 32 of lower portion 30. As the upper portion 20 is further extended from the lower portion 30, the overall length of the device increases, as can be seen, by the markings on the upper portion 22, which increase all the way up to one hundred and forty-four inches, i.e. twelve feet. Accordingly, the numbering scheme from the top 22 of upper portion 20, in inches, is as follows: 78, 77, 76, 75, 74, 73, 72, 79, 80, 81, 82, 83, . . . 141, 142, 143, 144. Also, as shown in FIG. 3A, markings in feet/inches, corresponding to the markings in inches alone, are provided on the upper portion 20. Same could also be provided on lower portion 30, if desired.

In operation, in order to measure the distance between two points, the device is positioned between the two points, the upper portion 20 extending from the lower portion 30 until the top end 22 is at one point and the bottom end 34 is at the other point. The distance between the two points is then read by the marking on the upper portion 20 that appears at the top end 32 of the lower portion 30. This represents the distance between the two points. To transfer this distance to another location, the device is merely moved to the other location and marks can be made at the top end 22 of the upper portion 20 and at the bottom end 34 of the lower portion to transfer the distance.

In order to mark one or more or a series of desired locations, one can position one or more marking devices 50 at the desired position along the measuring stick 10. Thereafter, the bottom end 34 of lower portion 30 is positioned at a desired location, the one or more markers 52 on marking devices 50 are brought into contact with the surface, and then one twists his or her wrist to swipe the markers 52 against a surface to be marked, by moving same along the direction shown by arrow B on FIG. 1, to effect marks at a desired location. If one is marking, for example, a plurality of stud locations along a beam, one can do so by marking a first set of locations and then moving the bottom end 34 to the last marked location and marking a next set of locations. In order to facilitate this process, a pivoting heel 36 may be provided at the bottom end 34 of the lower portion 30. As such, this heel 36 can be positioned exactly on a previously made mark, and when the device is twisted to move the markers 52 along the surface, the heel 36 rotates with respect to the measuring stick 10, along the direction shown by arrow A to facilitate accurate marking.

It should also be noted that marking devices 50 can be positioned to extend from the stick 10 in opposite directions to mark different items. For example, one marker 50 can be positioned to mark light switch positions and another can be positioned to mark electrical outlet positions. The stick 10 can then be placed with the bottom end 34 on the floor and used to mark the height of a switch position with one marker on one side, and then moved to another location and rotated 180 degrees to mark an outlet position at a different height.

Having thus described the invention in detail, it is to be understood that the foregoing description is not intended to limit the spirit and scope thereof. What is desired to be protected by Letters Patent is set forth in the appended claims.

What is claimed is:

1. An apparatus for marking distances on surfaces under construction comprising:

a lower portion having an upper end and a lower end;

an upper portion telescopically interconnected with the lower portion, the upper portion having a lower end and an upper end;

wherein the upper portion can be telescoped from the lower portion to a desired distance to measure a distance;

a pivotable heel attached to a lower end of the lower portion; and one or more markers positionable along the upper and lower sections, the one or more markers moveable along a surface for marking a plurality of locations on the surface.

2. The apparatus of claim 1 wherein the markers are movable along the upper and lower sections for marking a plurality of locations.

3. The apparatus of claim 1, further comprising marking indicia on opposite sides of the upper and lower sections.

4. A method of marking and transferring distances on surfaces under construction comprising:

providing a measuring stick;

interconnecting one or more markers to the measuring stick;

positioning the one or more markers at desired locations along the measuring stick;

positioning the measuring stick at a location where the distance is to be marked by placing a pivotable heel attached to a lower portion of the measuring stick against a surface at the location;

moving the one or more markers along a surface to mark the surface at the location with the marker;

moving the measuring stick to subsequent locations; and marking a surface at the subsequent locations with the one or more markers.

5. The method of claim 4, further comprising telescopically expanding the measuring stick to a desired length.

6. The method of claim 4, wherein the step of marking a surface comprises twisting one's wrist to move the marker along a surface.

7. The method of claim 4, further comprising moving the one or more markers to other locations along the measuring stick.

8. A marker holder for a measuring stick comprising:
a forward wall;
a holder attached to the forward wall for holding a marker;
opposing sidewalls having first and second ends, the first ends connected to the forward wall;
release tabs attached to the second ends of the opposing sidewalls; and
means for biasing the pair of opposing walls against the measuring stick for retaining the marker at a desired location on the stick.

9. The apparatus of claim 8, further comprising windows disposed on the sidewalls for allowing measurement readings.

10. The apparatus of claim 8, wherein the means for biasing comprises a spring positioned between the release tabs.

11. The apparatus of claim 8, wherein when the release tabs are squeezed together, the pair of opposing walls move away from the measuring stick and the holder can be moved along the measuring stick to another desired location along the stick.

12. An apparatus for marking distances on surfaces under construction comprising:
a lower portion having an upper end and a lower end;
an upper portion telescopically interconnected with the lower portion, the upper portion having a lower end and an upper end;
a pivotable heel attached to a lower end of the lower portion;
wherein the upper portion can be telescoped from the lower portion to a desired distance to measure a distance; and
one or more markers positionable along the upper and lower sections, the one or more markers moveable along a surface for marking a plurality of locations on the surface without marring said surface.

13. The apparatus of claim 12, wherein the markers are movable along the upper and lower sections for marking a plurality of locations.

14. The apparatus of claim 12, further comprising marking indicia on opposite sides of the upper and lower sections.

15. A method of marking and transferring distances on surfaces under construction comprising:
providing a measuring stick;
interconnecting one or more markers to the measuring stick;
positioning the one or more markers at desired locations along the measuring stick;
positioning the measuring stick at a location where the distance is to be marked by placing a pivotable heel attached to a lower portion of the measuring stick against a surface at the location;
marking a surface at the location with the marker without marring said surface;
moving the measuring stick to subsequent locations; and
marking a surface at the subsequent locations on surfaces under construction with the marker without marring said surface.

16. The method of claim 15, further comprising telescopically expanding the measuring stick to a desired length.

17. The method of claim 15, wherein the step of marking a surface comprises twisting one's wrist to move the marker along a surface.

18. The method of claim 15, further comprising moving the one or more markers to other locations along the measuring stick.

* * * * *